United States Patent
Oh (10) Patent No.: US 10,102,842 B2
(45) Date of Patent: Oct. 16, 2018

(54) VEHICLE AND METHOD FOR MANUFACTURING THE VEHICLE

(71) Applicants: HYUNDAI MOTOR COMPANY, Seoul (KR); KIA MOTORS CORPORATION, Seoul (KR)

(72) Inventor: ChiSung Oh, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/381,734

(22) Filed: Dec. 16, 2016

(65) Prior Publication Data

US 2018/0061392 A1 Mar. 1, 2018

(30) Foreign Application Priority Data

Aug. 30, 2016 (KR) .................. 10-2016-0110527

(51) Int. Cl.
*G10K 11/16* (2006.01)
*G10K 11/178* (2006.01)
(Continued)

(52) U.S. Cl.
CPC .......... *G10K 11/178* (2013.01); *B62D 65/005* (2013.01); *G10K 11/1788* (2013.01);
(Continued)

(58) Field of Classification Search
CPC ............ H04R 29/00; H04R 29/001004; H04R 29/005; H04R 29/006; H04R 29/008; H04R 1/28; H04R 2499/13; H04R 5/023; H04R 1/34; G10K 11/175; G10K 11/178; G10K 11/1782; G10K 11/1784; G10K 11/1786; G10K 11/1788; G10K 2210/129; G10K 2210/1291; G10K 2210/1282; G10K 2210/128; G10K 2210/1281; G10K 2210/12821; G10K 2210/12822; G10K 2210/1283; G10K 2210/1082; G10K 2210/3226; G10K 11/18; G10K 11/16; B62D 65/005; B62D 65/024;
(Continued)

(56) References Cited

U.S. PATENT DOCUMENTS

| 5,434,783 A * | 7/1995 | Pal ....................... G05B 13/027 280/5.517 |
| 2004/0164854 A1 * | 8/2004 | Nantz ................. B60C 23/0416 340/443 |

(Continued)

FOREIGN PATENT DOCUMENTS

| JP | H05-181487 A | 7/1993 |
| JP | 2009-220730 A | 10/2009 |
| JP | 2010-070023 A | 4/2010 |

*Primary Examiner* — Leshui Zhang
(74) *Attorney, Agent, or Firm* — McDermott Will & Emery LLP (57) ABSTRACT

A vehicle includes a suspension system, a sensor for measuring a vibration signal produced from the suspension system, and a microphone for measuring a noise signal in an interior of the vehicle caused by the vibration signal, wherein the sensor is installed at an interior sensor position determined based on an analysis of a level of contribution of the vibration signal to the noise signal, from among candidate sensor positions in the interior of the vehicle.

17 Claims, 9 Drawing Sheets

(51) Int. Cl.
*B62D 65/00* (2006.01)
*B60G 15/06* (2006.01)

(52) U.S. Cl.
CPC ........ *B60G 15/06* (2013.01); *B60G 2400/821* (2013.01); *B60G 2600/44* (2013.01); *G10K 2210/129* (2013.01); *G10K 2210/12821* (2013.01); *G10K 2210/3046* (2013.01)

(58) Field of Classification Search
CPC .... B62D 65/026; B62D 65/028; B60G 15/02; B60G 15/04; B60G 15/06; B60G 15/063; B60G 15/065; B60G 15/067; B60G 15/08; B60G 15/10; B60G 15/12; B60G 15/14; B60G 2400/80; B60G 2400/82; B60G 2400/821; B60G 2400/823; B60G 2400/824; B60G 2400/8424; B60G 2400/95; B60G 2400/98; B60G 2600/44; B60R 11/02; F01N 1/00; F16F 15/02; H03H 21/00
USPC ........... 381/86, 302, 71.1–71.14, 91, 92, 93, 381/94.1–94.9, 95, 97, 98, 99–110, 119, 381/120, 121, 122, 123, 56, 57, 58, 59, 381/60; 700/94; 702/54, 56
See application file for complete search history.

(56) References Cited

U.S. PATENT DOCUMENTS

2008/0262785 A1 10/2008 Meyder et al.
2011/0142248 A1 6/2011 Sakamoto et al.
2014/0314241 A1 10/2014 Penhune

* cited by examiner

| SINGLE COHERENCE FUNCTION | MULTIPLE COHERENCE FUNCTION |
|---|---|
| $\gamma_{ij}^2(f) = \dfrac{\|G_{ij}(f)\|^2}{G_{ii}(f) \cdot G_{jj}(f)}$ | $\gamma_{xd}^2(f) = \dfrac{G_{dd}(f) - G_{nn}(f)}{G_{dd}(f)} = 1 - \dfrac{G_{nn}(f)}{G_{dd}(f)}$ |

VEHICLE AND METHOD FOR MANUFACTURING THE VEHICLE

CROSS-REFERENCE TO RELATED APPLICATION

This application claims the benefit of priority to Korean Patent Application No. 10-2016-0110527, filed on Aug. 30, 2016 with the Korean Intellectual Property Office, the disclosure of which is incorporated herein by reference in its entirety.

TECHNICAL FIELD

The present disclosure relates to a vehicle and method for manufacturing the vehicle.

BACKGROUND

Noise that can be heard inside a vehicle is generated due to many factors, such as engine operation, rough road conditions, vibrations from the suspension system and wind noise. To reduce such noise, there are generally two methods: 1) a passive noise control method to reduce noise by installing sound absorbing material inside the vehicle, and 2) an active noise control (ANC) method to reduce noise by canceling out the noise by outputting a control signal having an opposite phase to the noise. As today's consumers are demanding more comfortable and more quiet cars, the ANC method is growing popular because it produces remarkable effects in damping the noise like vehicle engine noise, as compared to the passive noise control method.

In general, an ANC system employed in vehicles consists of a microphone, a sensor for detecting noise, a digital signal processor (DSP) module comprised of e.g., an adaptive digital filter and a signal controller for reversing the phase of the detected noise and a speaker for reproducing amplified noise. The principle of how the ANC system works is damping or canceling a sound pressure level of noise by generating an artificial sound that has the same amplitude but opposite phase to the noise inside the vehicle and overlapping the artificial sound and the noise.

To make the ANC system efficient, a noise reducing signal having an opposite phase to the phase of the noise in the vehicle should be generated.

The noise reducing signal is generated based on a vibration signal generated from the suspension system, in some embodiments. Accordingly, efficient noise reduction is achieved only by generating the noise reducing signal based on a vibration signal measured from a position at which the vibration signal highly contributes to the noise in the interior of the vehicle. Since the vibration signal is generated from the suspension system, a sensor (or sensors) is commonly installed around the suspension system normally located on the exterior of the vehicle. This may cause an increase in vehicle production expense and sensor maintenance expense due to the need for a package, or an apparatus, to protect the sensor against external environments and aging.

SUMMARY

The present disclosure provides a vehicle and method for manufacturing the vehicle, whereby a position of a sensor for measuring a vibration signal required in active noise control within the vehicle is determined and the sensor is installed in the determined position in the interior of the vehicle.

In accordance with one aspect of the present disclosure, a vehicle includes a suspension system, a sensor for measuring a vibration signal produced from the suspension system and a microphone for measuring a noise signal in the interior of the vehicle caused by the vibration signal, wherein the sensor is installed at an interior sensor position determined based on analysis of a level of contribution of the vibration signal to the noise signal, among selected candidate sensor positions in the interior of the vehicle.

The candidate sensor positions in the interior of the vehicle may comprise positions that satisfy a condition set up based on an exterior sensor position.

The exterior sensor position may comprise a position selected from among candidate sensor positions on the exterior of the vehicle based on analysis of a level of contribution of the vibration signal to the noise signal.

The candidate sensor positions on the exterior of the vehicle may comprise a plurality of arbitrary positions around a fixed point at which the suspension system is fixed onto the body of the vehicle.

The analysis of a level of contribution of the vibration signal to the noise signal may comprise measuring a level of contribution of the vibration signal to the noise signal using at least one of a single coherence function and a multiple coherence function.

Positions that satisfy a condition set up based on the exterior sensor position may comprise positions located within a physical distance set based on the exterior sensor position.

The positions that satisfy a condition set up based on the exterior sensor position may comprise positions at which vibration signals having intensities within a margin of error from an intensity of the vibration signal are measured.

The microphone may be installed at more than one different positions in the interior of the vehicle.

The vehicle may comprise further a controller for generating a noise reducing signal having a phase opposite to a phase of the noise signal based on the vibration signal.

The vehicle may comprise further an amplifier for amplifying the noise reducing signal.

The vehicle may further comprise a speaker for outputting the amplified noise reducing signal to the outside.

A method for manufacturing a vehicle include measuring a vibration signal produced from a suspension system, measuring a noise signal in the interior of the vehicle caused by the vibration signal, selecting an exterior sensor position, selecting candidate sensor positions in the interior of the vehicle based on the exterior sensor position, determining an interior sensor position based on analysis of a level of contribution of the vibration signal to the noise signal, among the selected candidate sensor positions in the interior of the vehicle; and installing a sensor in the determined interior sensor position.

The sensor may comprise an acceleration sensor.

The selecting an exterior sensor position may comprise selecting candidate sensor positions on the exterior of the vehicle; and selecting a position from among the candidate sensor positions on the exterior of the vehicle based on analysis of a level of contribution of the vibration signal to the noise signal.

The selecting candidate sensor positions in the interior of the vehicle based on the exterior sensor position may comprise selecting positions that satisfy a condition set up based on the exterior sensor position as the candidate sensor positions in the interior of the vehicle.

The determining an interior sensor position based on analysis of a level of contribution of the vibration signal to the noise signal, among the selected candidate sensor positions in the interior of the vehicle may comprise measuring a level of contribution of the vibration signal to the noise signal using at least one of a single coherence function and a multiple coherence function.

The positions that satisfy a condition set up based on the exterior sensor position may comprise positions located within a physical distance set based on the exterior sensor position.

The positions that satisfy a condition set up based on the exterior sensor position may comprise positions at which vibration signals having intensities within a margin of error from an intensity of the vibration signal are measured.

The measuring a noise signal in the interior of the vehicle caused by the vibration signal may comprise measuring the noise signal at more than one different position in the interior of the vehicle.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

An embodiment of a vehicle and method for manufacturing the vehicle will now be described with reference to FIGS. 1 to 9.

Figure 1:
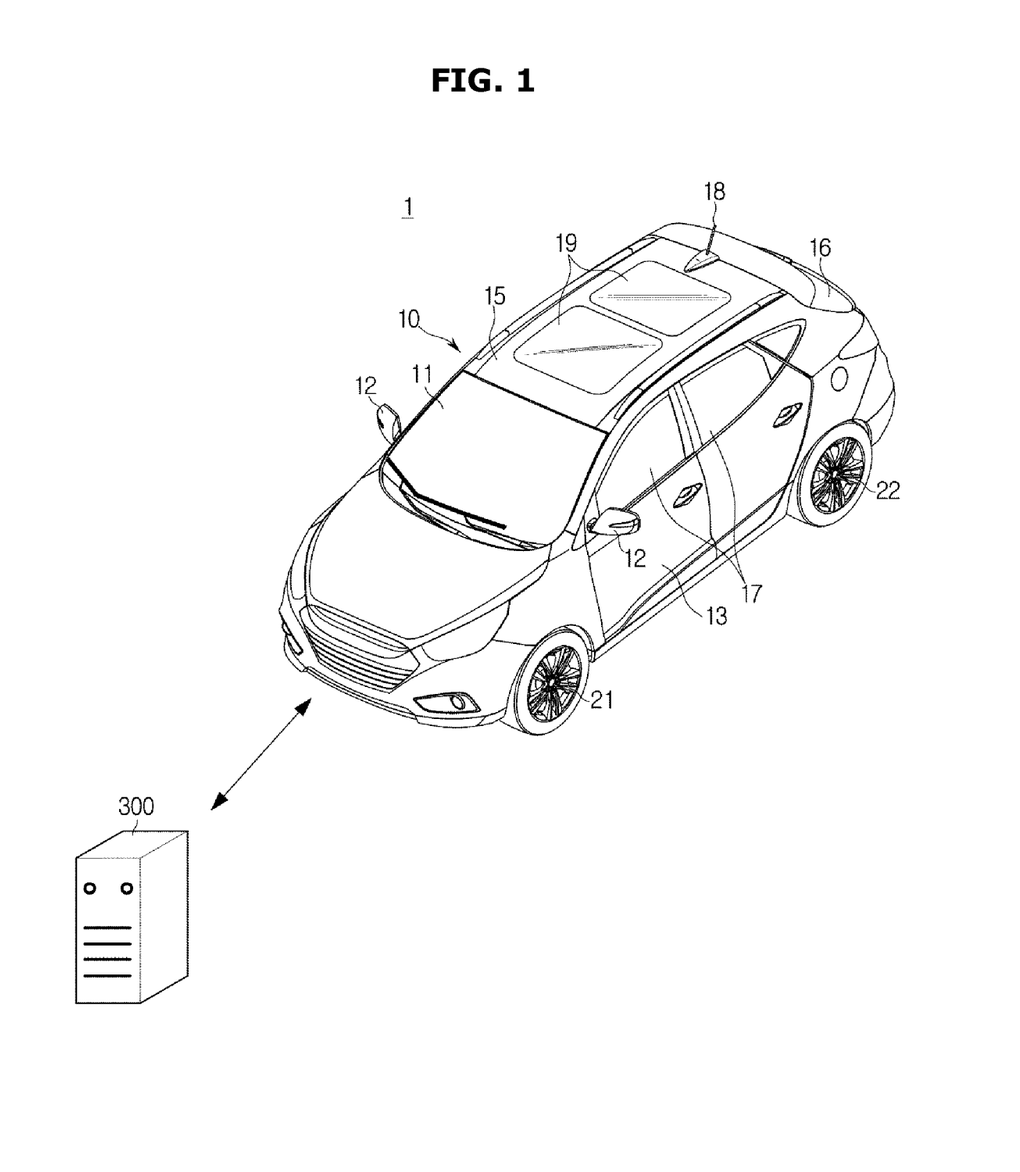
FIG. 1 shows an exterior of a vehicle and a sensor determination device, according to exemplary embodiments of the present disclosure.
Figure 2:
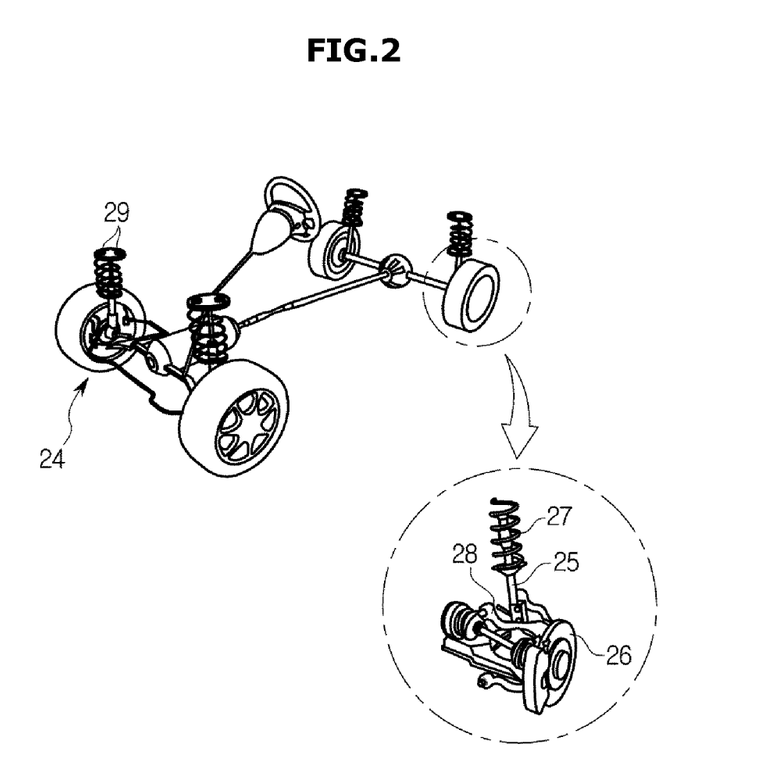
FIG. 2 shows a suspension system of a vehicle, according to exemplary embodiments of the present disclosure.

FIG. 1 shows an interior of a vehicle, according to exemplary embodiments of the present disclosure. FIG. 2 shows a suspension system of a vehicle, according to exemplary embodiments of the present disclosure.

Referring to FIG. 1, the exterior of a vehicle 1 may include a main body 10 that constitutes the exterior of the vehicle 1, a suspension system 24 which is a structural system of the vehicle 1 for absorbing shocks from road surfaces to prevent the shocks from being delivered to the vehicle 1 or people in the vehicle 1 and producing vibration (vibration signals), a windscreen 11 for providing views ahead of the vehicle 1 for the driver, side mirrors for helping the driver see views behind the vehicle 1, doors 13 for shielding the interior of the vehicle 1 from outside, front wheels 21 located in the front part of the vehicle 1, rear wheels 22 located in the rear part of the vehicle 1, a sunroof mounted on a roof panel 15 and windows installed on the sides of the vehicle 1. The front and rear wheels 21 and 22 may be collectively called 'car wheels.'

The suspension system 24 may include a shock absorber 25, a disc brake 26, a spring 27 and a suspension arm 28. The suspension system 24 may absorb shocks or shakes caused from road conditions and prevent them from directly affecting the body of the vehicle or people in the vehicle, and ensure that tires are grounded to the road. The vibration produced from the suspension system 24 may be delivered to the interior of the vehicle 1 through the shock absorber 25 and the spring 27, and the delivered vibration may cause a noise signal inside the vehicle 1. The noise signal has a unique phase, and may be reduced or canceled by a noise reduction signal having a phase opposite (opposite phase) to the noise signal.

A system for reducing or canceling the noise in this way is called an active noise control (ANC) system, and may be applied in the interior of the vehicle 1. For efficient ANC, it is important to generate the noise reducing signal having the opposite phase to a phase of the noise signal, and the noise reducing signal may be generated using the vibration signal measured by a sensor 220 (see FIG. 5). Furthermore, since the noise signal in the interior of the vehicle is caused by the vibration signal produced from the suspension system 24, the sensor 220 needs to be installed where a level of contribution of the vibration signal to the noise signal is high. This is because efficient noise reduction is achieved in the interior of the vehicle only by generating the noise reducing signal using the vibration signal measured at a position where the level of contribution of the vibration signal to the noise signal is high.

The sensor 220 (of FIG. 5) is conventionally installed on the exterior of the vehicle 1. In some cases, the sensor 220 is installed around a fixed point 29 of the suspension system 24 on the exterior of the vehicle 1. In this regard, extra expenses for packaging and maintenance of the sensor 220 to protect it from harsh environments are incurred. This leads to an increase in vehicle manufacturing costs.

Accordingly, if the sensor 220 is installed not on the exterior but in the interior of the vehicle 1, it may reduce vehicle manufacturing costs. In this case, however, the position where the sensor is installed in the interior of the vehicle 1 should be where there is little difference in measurement of vibration signal from a position on the exterior of the vehicle 1. A procedure of determining an optimal position for the sensor 220 to be installed among a plurality of positions in the interior of the vehicle 1 will be described later with reference to FIGS. 5 and 6.

The shock absorber 25 may improve driving comfort by absorbing shocks and shakes due to road surface conditions while the vehicle 1 is driven. The shock absorber 25 is installed between the suspension system 24 and the car body for reducing motion by aperiodic motion of the coil spring and the leaf spring, increasing driving stability and significantly improving driving comfort by absorbing small vertical shocks.

The disc brake 26 may contact a rotating disc with a pad, thereby producing braking force. The disc brake 26 is comprised of the disc that rotates along with a wheel hub, the pad disposed close to, or in contact with, the disc for producing friction, a hydraulic piston and a caliper where the piston is installed.

The spring 27 refers to a buffer made by winding a round bar of spring steel.

A suspension arm 28 is a member that serves as an arm to control wheel motion, also called a control arm, and attached on the body or the car shaft by a ball joint, a pillow ball, a rubber bush, etc.

The fixed point 29 refers to a point that corresponds to a position where the suspension system 24 is to be mounted onto the car body, and vibration produced from the suspension system 24 may be transferred to the interior of the vehicle 1 through the fixed point 29. In a case that the sensor 220 is installed on the exterior of the vehicle 1, and is generally installed around the fixed point 29.

The windscreen 11 is mounted on the upper front of the main body 10 for allowing the driver to obtain views ahead of the vehicle 1. The side mirrors 12 include a left side mirror and a right side mirror placed on the left and right sides of the main body 10, respectively, for helping the driver obtain views behind and to the sides of the vehicle 1.

The roof panel 15 may include the sunroof 19 for circulating inside and outside air and giving the driver pleasant experiences with the sunroof 19 open.

The sunroof 19 may be opened/shut by the user's input command, and whether jamming occurs while the sunroof 19 is operated may be determined.

The doors 13 may be pivotally attached onto the left and right sides of the main body 10, and opened for the driver and passenger to get into or get out of the vehicle 1 and closed for shielding the inside of the vehicle 1 from the outside.

Furthermore, the vehicle 1 may further include an antenna device 18 mounted on the roof panel 15 for receiving radio signals, broadcast signals, and satellite signals, and receiving/transmitting signals from/to other vehicles, a server of an intelligent transportation system (ITS) and/or a base station.

The antenna device 18 may be mounted on the exterior of the vehicle 1.

More specifically, since the antenna device 18 is implemented in a subminiature module in a low position, it may be mounted on the roof panel 15 or the front panel, without being limited thereto.

The antenna device 18 may also be implemented to be integral with heat wires behind the roof panel 15, i.e., on the upper part of the rear window glass 16. If the antenna device 18 is installed on the roof panel 15, it may be a micropole type antenna or a shark fin type antenna.

A sensor determination device 300 may determine positions of a plurality of sensors 220 installed either or both in the interior and on the exterior of the vehicle 1. The sensor 220 may include at least one of an acceleration sensor 221, a gyro sensor, a motion sensor, a displacement sensor and a torque sensor. Accordingly, the sensor determination device 300 may include one or more processors for performing calculations of determining the position of the sensor.

The sensor determination device 300 may also exchange information about a final sensor position determined by sensor positioning operations with at least one of the vehicle, external devices, and external servers through wired or wireless communication. The sensor determination device 300 may be an extra device located outside the vehicle, or may be a processor built into the vehicle.

Figure 3:
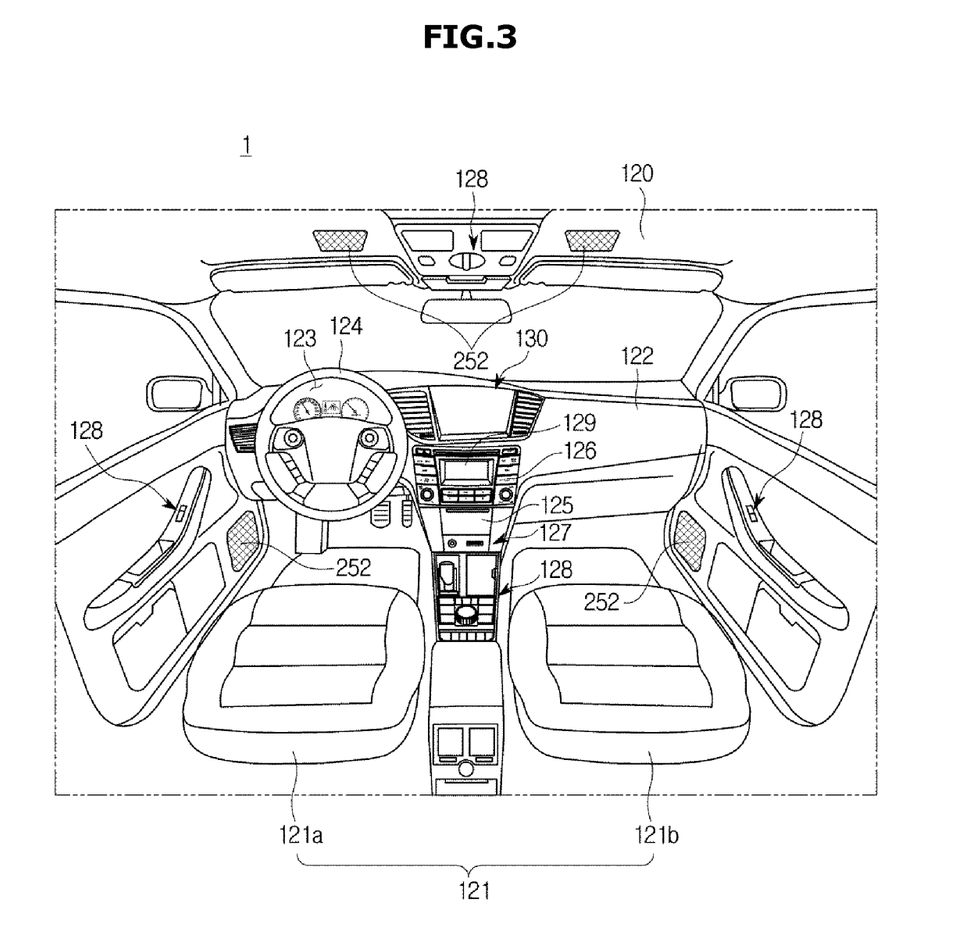
FIG. 3 shows an interior of a vehicle, according to exemplary embodiments of the present disclosure.

FIG. 3 shows the interior of a vehicle, according to exemplary embodiments of the present disclosure.

An interior part 120 of the car body includes seats 121 (121*a* and 121*b*), a dashboard 122, an instrument cluster (or cluster) 123 placed on the dashboard 122 containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a steering wheel 124 for steering control of the vehicle and a center fascia 125 having a control pad for controlling the audio system and air conditioning (AC) and ventilation system.

The interior part 120 of the car body may also include at least one sensor 220 for measuring vibration signals produced from the suspension system 24 on the exterior of the vehicle 1. The vibration signal produced from the suspension system 24 is transferred to the interior of the vehicle 1 through contact around the fixed point 29 that combines the suspension system 24 with the car body, and causes noise in the interior of the vehicle 1.

The interior part 120 of the car body may also include a microphone 231 (see FIG. 5) for measuring the noise signal generated in the interior of the vehicle 1 due to the vibration transferred from the suspension system 24.

The interior part 120 may further include an output device 250 for amplifying a noise reducing signal having a phase opposite to the phase of the noise signal generated in the interior of the vehicle 1 and outputting the amplified noise reducing signal to the interior of the vehicle 1.

The output device 250 may include a speaker 252, for example. The speaker 252 may help reduce or cancel the noise inside the vehicle 1 by outputting the amplified noise reducing signal.

The seats 121 include a driver seat 121*a*, a passenger seat 121*b* and a back seat arranged in the back of the interior of the vehicle 1.

The cluster 123 may be digitally implemented. The digitally implemented cluster displays car information and traveling information in images.

The center fascia 125 is located on the dashboard between the driver seat 121*a* and the passenger seat 121*b*, including a head device 126 for controlling the audio system, AC and ventilation system and seat heaters.

The head device 126 may include a plurality of buttons for receiving commands to operate the audio system, the AC and ventilation system, and seat heating wires.

Air vents, a cigar jack, etc., may be installed on the center fascia 125 and there may be a multi-terminal 127 installed on or near the center fascia 125.

The multi-terminal 127 may be arranged to be close to the head device 146, and may include a universal serial bus (USB) port and an auxiliary (AUX) terminal, and optionally an SD slot.

The vehicle 1 may further include an input device 128 for receiving commands to operate various functions, and a display 129 for displaying information about an activated function and information input by the user.

The input device 128 may be placed on the vehicle door 13, head device 126 and center fascia 125, and include at least one mechanical button, such as ON/OFF buttons for operation of various functions, buttons to change settings of various functions, etc.

The input device 128 may send a manipulation signal of the button to an electronic control unit (ECU), a controller in the head device 126 or an Audio Video and Navigation (AVN) system 130.

The input device 128 may include a touch panel incorporated into the display of the AVN system 130. The input 128 may be activated and displayed on the display of the AVN system 130 in the form of at least one button, and receive information of the location of the button.

It is also possible that the input device 128 includes a jog dial (not shown) or a touch pad for the user to input an instruction to move or select a cursor displayed on the display of the AVN system 130. The jog dial or touch pad may be arranged on the center fascia.

More specifically, the input device 128 may receive a selection of a passive driving mode, in which the driver drives the vehicle by him/herself, and an autonomous driving mode, and once a selection of the autonomous driving mode is received, send an input signal of the autonomous driving mode to the ECU.

Furthermore, once the GPS function is selected, the input device 128 may receive and forward destination information to the AVN system 130, and once the DMB function is selected, it may receive and forward channel and volume information to the AVN system 130.

The user may use the input device 128 to place a command to operate at least one of the sunroof 19 and the windows 17.

The AVN system 130 may be arranged on the center fascia 125 for receiving information from the user and outputting results corresponding to the input information.

The AVN system 130 may perform at least one of GPS, DMB, audio, and video functions, and display road condition information, traveling information and the like while in the autonomous driving mode.

The AVN system 130 may be detachably installed on the dashboard.

The chassis of the vehicle further includes a power generating system, a power transfer system, a traveling gear, a steering system, a braking system, a suspension system, a transmission system, a fuel system, front, rear, left and right wheels, etc. The vehicle may further include various safety systems for safety of the driver and passengers.

The safety systems may include an airbag control device for the purpose of the safety of driver and passengers in case of adverse events, and an Electronic Stability Control (ESC) device for stabilizing the vehicle's position while the vehicle 1 is accelerating or cornering.

In addition, the vehicle 1 may further include at least one detector, such as an approximation sensor for detecting an obstacle or other vehicle approaching to the sides or behind, a rain sensor for detecting whether it is raining and the amount of rainfall, a wheel speed sensor for detecting the speed of the wheels of the vehicle 1, a lateral acceleration sensor for detecting lateral acceleration of the vehicle 1, a yaw rate sensor for detecting a change in angular velocity of the vehicle 1, a gyro sensor and a steering angle sensor for detecting turning of the steering wheel of the vehicle 1, etc.

The vehicle 1 includes the ECU for controlling operations of the power generating system, power transfer system, traveling gear, steering system, braking system, suspension system, transmission system, fuel system and various safety systems and sensors. The ECU will be described in more detail below with reference to FIG. 4.

Furthermore, the vehicle 1 may optionally include electronic devices, such as a hands-free system, a GPS, an audio system and Bluetooth system, a rear camera, a charging system for a terminal, E-Z pass (hi-pass in Korea) equipment, etc.

The vehicle 1 may further include an engine start button to provide a command to operate a starter motor (not shown).

Specifically, pushing the engine start button drives the starter motor, which in turn drives the power generating system, i.e., an engine (not shown).

The vehicle 1 further includes a battery (not shown) electrically connected to the terminal, audio system, indoor lighting system, starter motor, and other electronic devices for supplying power. The battery is charged using dynamic power of the internal generator or the engine while the vehicle is driven.

Figure 4:
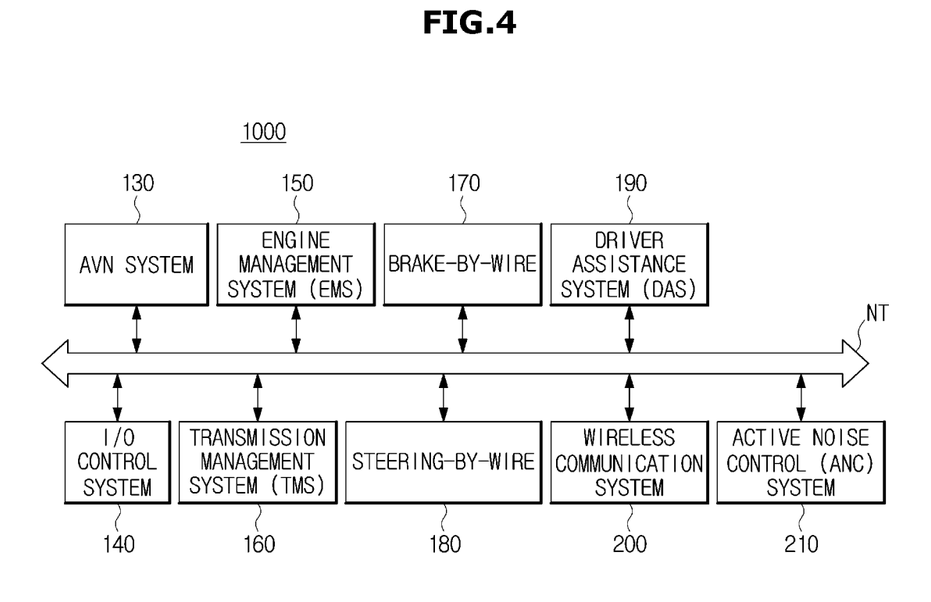
FIG. 4 shows electronic devices and systems included in a vehicle, according to exemplary embodiments of the present disclosure.

FIG. 4 shows electronic devices and systems included in a vehicle, according to exemplary embodiments of the present disclosure.

The vehicle 1 may include a power system (not shown) for generating power to drive the vehicle 1, a powertrain (not shown) for transferring the power generated by the power system to the wheels of the vehicle 1, a steering system (not shown) for controlling traveling direction of the vehicle 1, a brake system (not shown) for stopping rotation of the wheels, a suspension system e.g., the suspension system 24 (see FIG. 2) for damping the vibration of the vehicle 1, and an electronic device 1000 for electrically controlling the respective components included in the vehicle 1.

The power system may include an engine, a fuel system, a cooling system, an ignition system, etc., and the powertrain may include a clutch, a transmission, a differential gear and a drive shaft, etc.

The steering system may include a steering wheel, a steering gear, a steering link, etc., the brake system may include a brake disc, a brake pad, a master cylinder, etc., and the suspension system may include a shock absorber, etc.

The vehicle 1 may include various electronic devices 1000 together with the aforementioned mechanical systems.

Specifically, as shown in FIG. 4, the vehicle 1 may include an AVN system 130, an input/output control system 140, an Engine Management System (EMS) 150, a Transmission Management System (TMS) 160, a brake-by-wire 170, a steering-by-wire 180, a Driver Assistance System (DAS) 190, a wireless communication system 200 and an Active Noise Control (ANC) system 210, etc. The electronic device 1000 shown in FIG. 4 is only by way of example, and there may be many different electronic devices adopted in the vehicle 1. In some embodiments, the vehicle 1 may not include all the components of the electronic device 1000, and some of the components may be omitted if needed or if such an omission would enhance the clarity of the disclosure.

Various systems included in the electronic device 1000 of the vehicle 1 may communicate to one another through a vehicle communication network (NT). The vehicle NT may employ various communication protocols like Media Oriented Systems Transport (MOST) with a communication speed of up to 24.5 Megabits per second (Mbps), FlexRay with a communication speed of up to 10 Mbps, Controller Area Network (CAN) with a communication speed of 125 kilobits per second (kbps) to 1 Mbps, Local Interconnect Network (LIN) with a communication speed of 20 kbps, etc. Such a vehicle NT may employ not only a single communication protocol like the MOST, FlexRay, CAN, LIN, etc., but also a plurality of communication protocols.

The AVN system 130 plays music or video according to the driver's control command specifically, the AVN system 130 may reproduce music or video, or give directions to the destination.

The input/output control system 140 may receive the driver's control command through buttons, and accordingly display corresponding information or perform corresponding operations. The input/output control system 140 may also include a cluster display arranged on the dashboard for displaying vehicle speed, engine rpm, an amount of fuel, etc., and a wheel button module installed in the steering wheel.

The EMS 150 performs fuel injection control, fuel economy control, lean burn control, ignition timing control, idle rpm control and the like. The EMS 150 may correspond not only to a single system, but also to a plurality of systems connected to one another through communication.

The TMS 160 performs shifting point control, damper clutch control, pressure control when the friction clutch is on or off, engine torque control during transmission and the like. The TMS 160 may correspond not only to a single system, but also to a plurality of systems connected to one another through communication.

The brake-by-wire 170 may control braking of the vehicle 1, and may typically include an Anti-lock Brake System (ABS).

The steering-by-wire 180 assists the driver in steering manipulation by reducing steering power while the vehicle 1 is driven at low speed or is parked, and increasing steering power while the vehicle 1 is driven at high speed.

The DAS 190 may support traveling of the vehicle 1 by performing a forward collision avoidance function, a lane departure warning function, a blind spot monitoring function and a rear view monitoring function, etc.

The DAS 190 may include a plurality of devices connected to one another through communication. For example, the DAS 190 may include a Forward Collision Warning System (FCW), an Advanced Emergency Braking System (AEBS), an Adaptive Cruise Control (ACC), a Lane Departure Warning System (LDWS), a Lane Keeping Assist System (LKAS), a Blind Spot Detector (BSD) a Rear-end Collision Warning System (RCW), etc.

The wireless communication system 200 may communicate an external vehicle, an external terminal or a communication relay.

The wireless communication system 200 may exchange signals according to various communication protocols. For example, the wireless communication system 200 may employ a second generation (2G) communication scheme, such as Time Division Multiple Access (TDMA), Code Division Multiple Access (CDMA), etc., a third generation (3G) communication scheme, such as Wide Code Division Multiple Access (WCDMA), Code Division Multiple Access 2000 (CDMA2000), Wireless Broadband (Wibro), World Interoperability for Microwave Access (WiMAX), etc., and a fourth generation (4G) communication scheme, such as Long Term Evolution (LTE), Wireless Broadband Evolution (Wibro Evolution), etc. In addition, the wireless communication system 200 may employ a fifth generation (5G) communication scheme.

The ANC system 210 may control various types of noise generated inside the vehicle 1. Specifically, the ANC system 210 may cancel the noise by generating and outputting a signal having an opposite phase to that of the noise generated inside the vehicle 1.

The exterior, interior and systems of the vehicle 1 have thus far been described.

Figure 5:
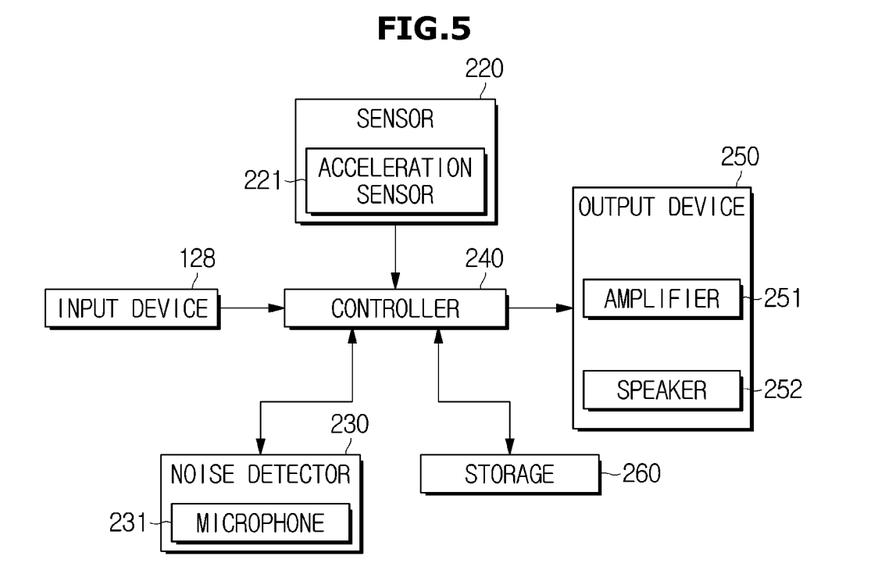
FIG. 5 is a block diagram of a vehicle including an active noise control system, according to exemplary embodiments of the present disclosure.

FIG. 5 is a block diagram of a vehicle including an ANC system, according to exemplary embodiments of the present disclosure.

An input device 128 may receive commands to control a plurality of electronic systems included in the vehicle 1. The driver and passenger(s) of the vehicle 1 may input various types of control commands to the controller 240 of the vehicle 1 through the input device 128. Further description of the input device 128 will be omitted herein because an example of the input device 128 was described above in connection with FIG. 3.

The sensor 220 may measure a vibration signal produced from the suspension system 24 shown in FIG. 2. The sensor 220 may also include an acceleration sensor 221. The acceleration sensor 221 may measure dynamic power, or data, like acceleration, vibration and shocks.

The sensor 220 may be installed at an interior sensor position determined based on the analysis of levels of contribution of vibration signals measured at selected candidate sensor positions to a noise signal in the interior of the vehicle 1.

The candidate positions in the interior of the vehicle 1 may include positions that satisfy conditions set up based on an exterior sensor position.

The exterior sensor position may include a position selected based on the analysis of levels of contribution of vibration signals at candidate sensor positions on the exterior of the vehicle 1 to a noise signal.

Analyzing the level of contribution of a vibration signal to a noise signal may include measuring a level of contribution of a vibration signal to a noise signal using at least one of a single coherence function and a multiple coherence function.

The candidate sensor positions on the exterior of the vehicle 1 may include a plurality of arbitrary positions around the fixed point at which the suspension system is fixed onto the main body of the vehicle 1.

Positions satisfying conditions set up, or selected, based on the exterior sensor position may include positions within a physical distance set based on the exterior sensor position.

The positions satisfying conditions set up based on the exterior sensor position may include positions at which vibration signals having intensities within a margin of error from an intensity of the vibration signal are measured.

The sensor 220 may send the measured vibration signal to the controller 240, which may, in turn, generate a noise reducing signal based on the received vibration signal.

A noise detector 230 may detect noise generated inside the vehicle 1. For example, the noise detector 230 may detect the noise due to friction between tires and a road surface while the vehicle 1 is driven, the noise generated while vibrations of the suspension system 24 are transferred to the main body of the vehicle 1, the noise due to operations of the engine system and the noise of window blown through an open window.

The noise detector 230 may send information about the detected noise to the controller 240 in the form of an electric signal. The information about the detected noise may include intensity, frequency, etc., of the noise. The information about the detected noise may be defined as a noise signal.

The noise detector 230 may also include a microphone 231.

The microphone 231 is a sensor for detecting sound pressure corresponding to the interior noise of the vehicle 1, has a type of an electric condenser having good properties in a low frequency band of less than 500 kHz that aims at noise reduction, and is preferably installed around the headrest of each seat of the vehicle 1 or on the top ceiling of the vehicle 1.

The microphone 231 may measure the noise signal in the interior of the vehicle 1 generated due to vibration. The microphone 231 may also be installed at more than one distinct position in the interior of the vehicle 1. Accordingly, the microphone 231 may detect the noise signal at more than one different position in the interior of the vehicle 1. Furthermore, the microphone 231 may measure not only the noise signal in the interior of the vehicle 1 generated due to vibration of the suspension system 24 but also other various types of noise signals as described above. The microphone 231 may send the measured noise signal to the controller 240 in the form of an electric signal.

The controller 240 may use the information received from at least one of the sensor 220 and the noise detector 230 to control the noise generated in the interior of the vehicle 1.

The controller 240 may receive a vibration signal measured by the sensor 220, and generate a noise reducing signal having an opposite phase to the phase of the noise signal based on the received vibration signal. Specifically, since the noise generated inside the vehicle 1 is caused from the vibration of the suspension system 24, the vibration signal measured by the sensor 220 may include information about the noise signal in the interior of the vehicle 1.

Accordingly, the controller 240 may obtain information about a phase of the noise signal by analyzing the vibration signal received from the sensor 220. For example, the controller 240 may obtain information about a frequency of the noise signal by analyzing the information about the frequency of the vibration signal, or obtain information about a phase of the noise signal by analyzing information about the phase of the vibration signal.

After that, the controller 240 may generate the noise reducing signal having a phase opposite to the phase of the noise signal obtained using the vibration signal.

Furthermore, the controller 240 may receive information about the noise signal from the microphone 231, and use the received information about the noise signal to generate the noise reducing signal having an opposite phase than the phase of the noise signal.

The controller 240 may send the generated noise reducing signal to the output device 250 in the form of an electric signal.

The output device 250 may include an amplifier 251 for amplifying the noise reducing signal received from the controller 240, and a speaker 252 for outputting the amplified noise reducing signal. The output device 250 may amplify the noise reducing signal received from the controller 240 using the amplifier 251, and output the amplified noise reducing signal through the speaker 252. In this case, since the phases of the noise signal generated in the interior of the vehicle 1 and the noise reducing signal are opposite from each other, the noise signal is damped. Accordingly, the noise inside the vehicle 1 may be reduced or canceled.

A storage 260 may store various information received from the controller 240. The storage 260 may store other various information like frequency information, phase information, amplitude information, etc., of at least one of the vibration signal measured by the sensor 220 and the noise signal measured by the noise detector 230.

The storage 260 may include at least one type of storage media among flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk and/or an optical disk.

Figure 6:
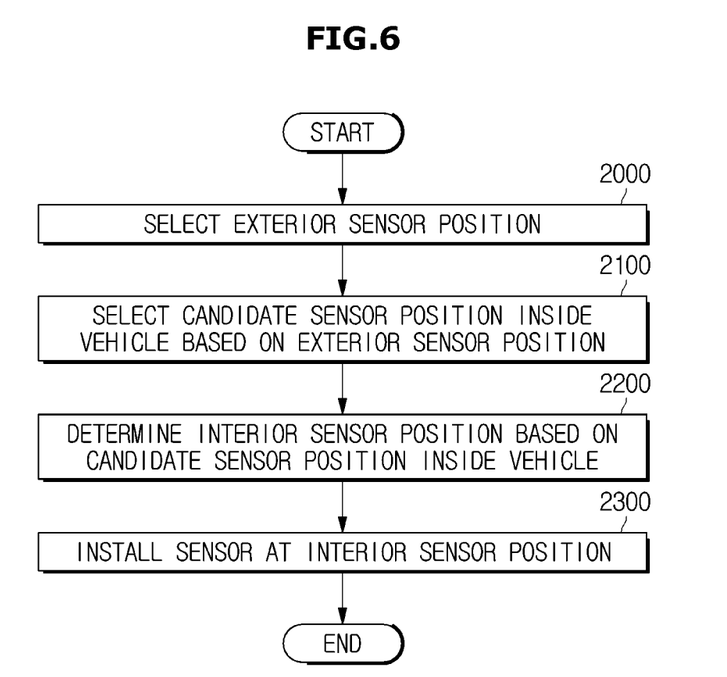
FIG. 6 is a flowchart illustrating a procedure of installing a sensor in an interior of a vehicle, according to exemplary embodiments of the present disclosure.
Figure 7:
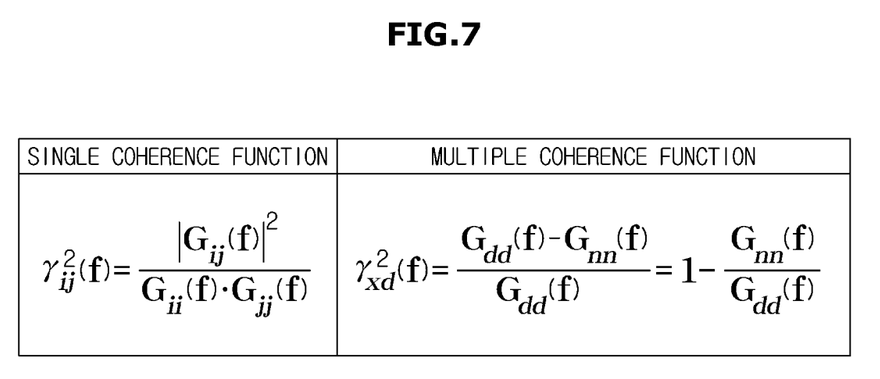
FIG. 7 shows a single coherence function and a multiple coherence function, according to exemplary embodiments of the present disclosure.
Figure 8:
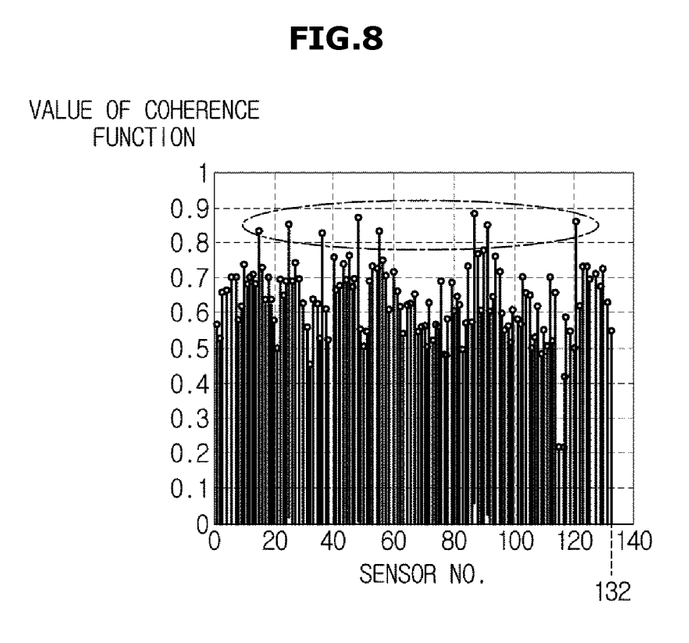
FIG. 8 shows levels of contribution of vibration signals to a noise signal at a plurality of sensor positions, according to exemplary embodiments of the present disclosure.

FIG. 6 is a flowchart illustrating a procedure of installing a sensor in an interior of a vehicle, according to exemplary embodiments of the present disclosure. FIG. 7 shows a single coherence function and a multiple coherence function, according to exemplary embodiments of the present disclosure. FIG. 8 shows contribution levels of vibration signals to a noise signal at every sensor position, or a plurality of sensor positions, according to exemplary embodiments of the present disclosure.

A procedure of determining an interior sensor position at which to install a sensor to measure a vibration signal based on an exterior sensor position and installing the sensor at the interior sensor position will now be described with reference to FIGS. 6 to 8.

As described above, the controller 240 generates the noise reducing signal having a phase opposite to the phase of the noise signal based on the vibration signal measured by the sensor 220. The noise signal in the interior of the vehicle 1 is generated due to vibrations.

Therefore, since the controller 240 obtains the information about the noise signal generated inside the vehicle 1 from vibration signals, it is important to measure a vibration signal that has a great level of contribution to the noise signal.

Since the measurement of such a vibration signal is commonly performed at the suspension system 24, the sensor 220 for measuring the vibration signal is installed at the suspension system 24. That is, the sensor 220 is located on the exterior of the vehicle 1.

In this case, the sensor 220 is exposed to the outside, thus requiring packaging to protect the sensor 220, which incurs expenses. Accordingly, it is beneficial to install the sensor 220 in the interior of the vehicle 1 in terms of manufacturing costs of the vehicle 1 if there is no significant, or large, difference in ANC performance between generating a noise reducing signal using a vibration signal measured from the sensor 220 installed at the suspension system 24 on the exterior of the vehicle 1 with generating a noise reducing signal using a vibration signal measured from the sensor 220 installed in the interior of the vehicle 1.

In other words, changing the installation position of the sensor 220 from an exterior to an interior of the vehicle 1 should only be performed when there is little difference in ANC performance between when the sensor 220 is located on the exterior of the vehicle 1 and when the sensor 220 is located in the interior of the vehicle 1.

Accordingly, candidate sensor positions in the interior of the vehicle 1 should be selected based on an exterior sensor position of the sensor 220; levels of contribution of vibration signals measured at the selected candidate sensor positions to the noise signal should be analyzed; and an interior sensor position should be determined based on the analysis. The interior sensor position determined is a final position for the sensor 220 to be installed at. After that, the vehicle 1 is manufactured to have the sensor 220 located in the interior of the vehicle 1 where the sensor 220 is installed in the final position.

Specifically, in the method for manufacturing the vehicle 1 with the sensor 220 located in the interior of the vehicle 1, an exterior sensor position is selected first, in 2000.

In order to select the exterior sensor position based on candidate positions on the exterior of the vehicle 1, single and multiple coherence functions are used, which will be described below.

Referring to FIG. 7, the single and multiple coherence functions are given as follows:

$$\gamma_{ij}^2(f) = \frac{|G_{ij}(f)|^2}{G_{ii}(f) \cdot G_{jj}(f)} \quad \text{(EQUATION 1)}$$

$$i, j = 1, 2, \ldots, q$$

The single coherence function $\gamma_{ij}^2(f)$ is a function used to represent linear dependence of a single input (a single vibration signal) and a single output (a noise signal). The single coherence function may have a value ranging from 0 to 1.

$G_{ij}(f)$ is the cross-spectrum of the i'$^{th}$ input signal (vibration signal) and output signal y (noise signal), $G_{ii}(f)$ is the self-spectrum of the input signal (vibration signal), and $G_{jj}(f)$ is the self-spectrum of the output signal (noise signal).

A level of contribution of each vibration signal (input signal) to the noise signal (output signal) may be determined through the single coherence function. It may be represented by a value ranging from 0 to 1.

The multiple coherence function is given as follows:

$$\gamma_{x:d}^2(f) = \frac{G_{dd}(f) - G_{nn}(f)}{G_{dd}(f)} = 1 - \frac{G_{nn}(f)}{G_{dd}(f)} \quad \text{(EQUATION 2)}$$

The multiple coherence function $\gamma_{x:d}^2(f)$ is a function used to represent linear dependence of multiple inputs (multiple vibration signals) and a single output (a noise signal). $G_{dd}(f)$ is the self-spectrum of the output signal (vibration signal), and $G_{nn}(f)$ is the self-spectrum of the external noise.

Unlike using the single coherence function, a level of contribution of multiple vibration signals (input signals) to the noise signal (output signal) may be figured out through the multiple coherence function. It may be represented by a value ranging from 0 to 1.

The exterior sensor position may be selected based on the analysis of levels of contributions of vibration signals at the candidate sensor positions on the exterior of the vehicle 1 to the noise signal.

The exterior sensor position may be selected to have the largest level of contribution of the vibration signal to the noise signal among arbitrary positions around the fixed point 29 on the suspension system 24.

In other words, selecting the exterior sensor position includes selecting candidate sensor positions on the exterior of the vehicle 1 and selecting the exterior position from among the candidate sensor positions on the exterior of the vehicle 1 based on the analysis of levels of contribution of the vibration signals to the noise signal.

Specifically, a plurality of sensors 220 may be attached at a plurality of arbitrary, or varied, positions (candidate sensor positions) around the fixed point on the suspension system 24 for measuring a plurality of vibration signals.

The first step of selection of an exterior sensor position is selecting positions at which vibration signals having relatively high levels of contribution to the noise signal are measured, from among a plurality of positions at which vibration signals are measured, based on the single coherence function.

Next, the second step of selection of an exterior sensor position is selecting a position at which a vibration signal having the highest level of contribution of a combination of vibration signals at the positions at which the relatively high vibration signals are measured based on the single coherence function for the noise signal is measured based on the multiple coherence function.

Through the first and second steps of selection of an exterior sensor position, an exterior position at which a vibration signal with the highest level of contribution to the noise signal is measured may be determined, and the exterior position is called an exterior sensor position.

Simply put, for example, assuming there are 132 candidate sensor positions on the exterior of the vehicle 1, 132 vibration signals (input signals) are measured at the 132 candidate sensor positions, and 8 positions having relatively high levels of contribution to a noise signal (output signal) in the interior of the vehicle 1 are selected from among the 132 candidate sensor positions, using the single coherence function. This may be represented in a graph of FIG. 8.

After that, among the 8 positions, a position at which a vibration signal having the highest level of contribution to the noise signal is measured is selected based on the multiple coherence function. The position corresponds to the exterior sensor position, as described above.

Once the exterior sensor position is selected, candidate sensor positions in the interior of the vehicle 1 are determined based on the exterior sensor position, in 2100.

Determination of an interior position of the sensor 220 should be made under the assumption that there is little difference in ANC performance between exterior and interior positions where the sensor 220 can be installed. Accordingly, the candidate sensor positions in the interior of the vehicle 1 are determined based on the determined exterior sensor position.

The candidate sensor positions in the interior of the vehicle 1 may be determined based on the exterior sensor position, and may satisfy some established conditions.

The candidate sensor positions in the interior of the vehicle 1 may include positions within a physical distance from the exterior sensor position. For example, since vibration occurs at the suspension system 24, the candidate sensor positions in the interior of the vehicle 1 may be determined within a radius of 200 mm from the exterior sensor position.

The candidate sensor positions in the interior of the vehicle 1 may include positions at which vibration signals having intensities within a margin of error from an intensity of the vibration signal measured at the exterior sensor position are measured. This is because there is little difference in ANC performance between when the sensor 220 is at the exterior sensor position and when the sensor 220 is at the interior sensor position, as described above. The margin of error may be determined by the designer.

Once the candidate sensor positions in the interior of the vehicle 1 are determined as described above, an interior sensor position is determined based on the candidate sensor positions in the interior of the vehicle 1, in 2200.

The interior sensor position may be selected based on the analysis of levels of contribution of vibration signals at the candidate sensor positions in the interior of the vehicle 1 to the noise signal.

Specifically, selection of the interior sensor position may be made by selecting candidate sensor positions in the interior of the vehicle 1 and selecting the interior sensor position based on the analysis of levels of contribution of vibration signals at the candidate sensor positions in the interior of the vehicle 1 to the noise signal.

First, a plurality of sensors 220 are attached onto the selected candidate sensor positions in the interior of the vehicle 1 for measuring a plurality of vibration signals.

The first step of selection of an interior sensor position is selecting positions at which vibration signals having relatively high levels of contribution to the noise signal are measured, from among a plurality of positions at which vibration signals are measured, based on the single coherence function.

Next, the second step of selection of an interior sensor position is selecting a position as the interior sensor position, at which a vibration signal having the highest level of contribution of a combination of vibration signals at the positions at which the relatively high vibration signals are measured based on the single coherence function for the noise signal is measured based on the multiple coherence function.

Through the first and second steps of selection of an interior sensor position, a position at which a vibration signal with the highest level of contribution to the noise signal in the interior of the vehicle 1 is measured may be determined. In this way, the interior sensor position is determined.

The sensor 220 is installed in the determined interior sensor position, in 2300.

A procedure of determining an interior sensor position based on an exterior sensor position has thus far been described. The procedure is performed by the sensor determination apparatus 300 without being limited thereto.

Figure 9:
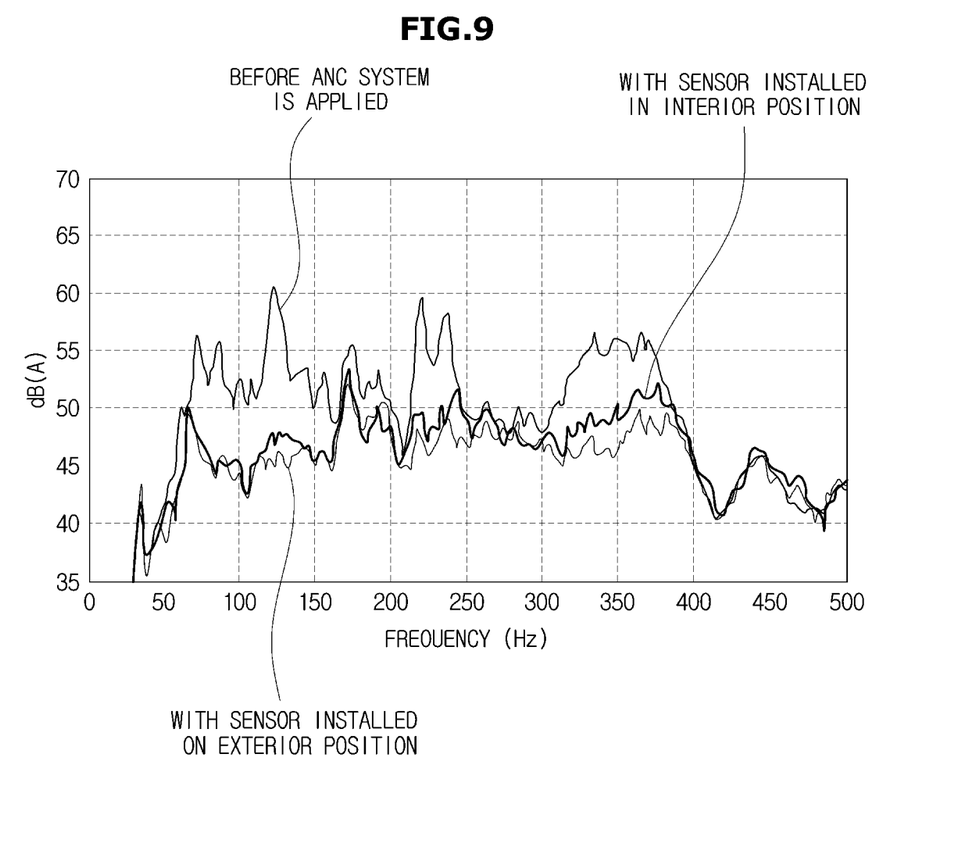
FIG. 9 is a graph of active noise control effects at a plurality of positions at which a sensor is installed, according to exemplary embodiments of the present disclosure.

FIG. 9 is a graph of ANC effects at every position, or a plurality of positions, in which a sensor is installed, according to exemplary embodiments of the present disclosure.

In the case where the sensor 220 for measuring a vibration signal is installed not on the exterior but in the interior of the vehicle 1, the noise level in the interior of the vehicle 1 is highest until the ANC system 210 is applied. After the ANC system 210 is applied, it is noted that there is little difference in ANC performance between when the sensor 220 for measuring a vibration signal is installed on the exterior of the vehicle 1 and the sensor 220 is installed in the interior of the vehicle 1. Accordingly, a packaging expense that would be incurred when the sensor 220 is be installed on the exterior of the vehicle 1 may be saved.

Referring to FIG. 9, from a comparison of noise in the interior of the vehicle 1 before and after the ANC system 210 is applied inside the vehicle 1 (i.e., before and after the sensor 220 for measuring a vibration signal is installed at an interior sensor position), it is seen that the noise inside the vehicle is remarkably reduced after the ANC system 210 is applied. This effect may be evaluated in numerical values, which is called Insertion Loss (IL). The IL before and after the ANC system 210 is applied is calculated as follows:

$$IL = 10 \log_{10}(1-\gamma^2(f)) \quad \text{(EQUATION 3)}$$

where $\gamma^2(f)$ refers to the coherence function as calculated above.

A vehicle and method for manufacturing the vehicle, by which a sensor to measure a vibration signal is determined to be installed at an interior position of the vehicle and the sensor is installed at the determined interior position, has thus far been described.

According to the aforementioned exemplary embodiments of a vehicle and method for manufacturing the vehicle, an optimal position in the interior of the vehicle to measure a vibration signal required in ANC within the vehicle may be determined.

Furthermore, a sensor may be installed in a position in the interior of the vehicle, thereby maintaining the ANC performance without a significant, or large, difference from when installed on the exterior of the vehicle, as well as saving the expense of packaging the sensor that would have been installed on the exterior of the vehicle, thus saving the vehicle manufacturing costs.

Although the present disclosure is described with reference to some embodiments as described above and accompanying drawings, it will be apparent to those ordinary skilled in the art that various modifications and changes can be made to the embodiments. For example, the aforementioned method may be performed in a different order, and/or the aforementioned systems, structures, devices, circuits, etc., may be combined in different combinations from what is described above, and/or replaced or substituted by other components or equivalents thereof, to obtain appropriate results. Therefore, other implementations, other embodiments and equivalents thereof may fall within the scope of the following claims.

What is claimed is:

1. A vehicle, comprising:
   a suspension system;
   a sensor for measuring a vibration signal produced from the suspension system; and
   a microphone for measuring a noise signal in an interior of the vehicle caused by the vibration signal,
   wherein the sensor is installed at an interior sensor position determined based on an analysis of a level of contribution of the vibration signal to the noise signal, from among candidate sensor positions in the interior of the vehicle,
   wherein the candidate sensor positions in the interior of the vehicle comprise positions that satisfy a condition set up based on an exterior sensor position, and
   wherein the exterior sensor position comprises a position selected from among candidate sensor positions on the exterior of the vehicle based on the analysis of the level of the contribution of the vibration signal to the noise signal.

2. The vehicle of claim 1, wherein the sensor comprises an acceleration sensor.

3. The vehicle of claim 1, wherein the candidate sensor positions on the exterior of the vehicle comprise a plurality of arbitrary positions around a fixed point at which the suspension system is fixed onto a body of the vehicle.

4. The vehicle of claim 1, wherein the analysis of the level of the contribution of the vibration signal to the noise signal comprises measuring a level of contribution of the vibration signal to the noise signal using at least one of a single coherence function and a multiple coherence function.

5. The vehicle of claim 1, wherein the positions that satisfy the condition set up based on the exterior sensor position comprise positions located within a physical distance set based on the exterior sensor position.

6. The vehicle of claim 1, wherein the positions that satisfy the condition set up based on the exterior sensor position comprise positions at which vibration signals having intensities within a margin of error from an intensity of the vibration signal are measured.

7. The vehicle of claim 1, wherein the microphone is installed at more than one distinct position in the interior of the vehicle.

8. The vehicle of claim 1, further comprising a controller for generating a noise reducing signal having a phase opposite to a phase of the noise signal.

9. The vehicle of claim 8, further comprising an amplifier for amplifying the noise reducing signal.

10. The vehicle of claim 9, further comprising a speaker for outputting the amplified noise reducing signal to the outside of the vehicle, or to the vehicle interior.

11. A method for manufacturing a vehicle, the method comprising:

measuring a vibration signal produced from a suspension system of the vehicle by a sensor;

measuring a noise signal in an interior of the vehicle caused by the vibration signal by a microphone;

selecting an exterior sensor position;

selecting candidate sensor positions in the interior of the vehicle based on the exterior sensor position;

determining an interior sensor position based on an analysis of a level of contribution of the vibration signal to the noise signal, from among the selected candidate sensor positions in the interior of the vehicle; and installing the sensor in the determined interior sensor position, wherein the step of selecting an exterior sensor position comprises selecting candidate sensor positions on the exterior of the vehicle; and selecting a position from among the candidate sensor positions on the exterior of the vehicle based on the analysis of the level of the contribution of the vibration signal to the noise signal.

12. The method of claim 11, wherein the sensor comprises an acceleration sensor.

13. The method of claim 11, wherein the step of selecting candidate sensor positions in the interior of the vehicle based on the exterior sensor position comprises selecting positions that satisfy a condition based on the exterior sensor position as the candidate sensor positions in the interior of the vehicle.

14. The method of claim 13, wherein the positions that satisfy the condition based on the exterior sensor position comprise positions located within a physical distance set based on the exterior sensor position.

15. The method of claim 13, wherein the positions that satisfy the condition set up based on the exterior sensor position comprise positions at which vibration signals having intensities within a margin of error from an intensity of the vibration signal are measured.

16. The method of claim 11, wherein the step of determining the interior sensor position based on analysis of a level of contribution of the vibration signal to the noise signal, from among the selected candidate sensor positions in the interior of the vehicle comprises measuring a level of contribution of the vibration signal to the noise signal using at least one of a single coherence function and a multiple coherence function.

17. The method of claim 11, wherein measuring the noise signal in the interior of the vehicle caused by the vibration signal comprises measuring the noise signal at more than one distinct position in the interior of the vehicle.

* * * * *